(12) United States Patent
Ishikawa (10) Patent No.: US 12,319,445 B2
(45) Date of Patent: Jun. 3, 2025

(54) FLIGHT DEVICE

(71) Applicant: ISHIKAWA ENERGY RESEARCH CO., LTD., Ota (JP)

(72) Inventor: Mitsuru Ishikawa, Ota (JP)

(73) Assignee: ISHIKAWA ENERGY RESEARCH CO., LTD., Ota (JP)

( * ) Notice: Subject to any disclaimer, the term of this patent is extended or adjusted under 35 U.S.C. 154(b) by 0 days.

(21) Appl. No.: 18/294,290

(22) PCT Filed: Aug. 2, 2022

(86) PCT No.: PCT/JP2022/029686
§ 371 (c)(1),
(2) Date: Feb. 1, 2024

(87) PCT Pub. No.: WO2023/042561
PCT Pub. Date: Mar. 23, 2023

(65) Prior Publication Data
US 2024/0343421 A1    Oct. 17, 2024

(30) Foreign Application Priority Data

Sep. 14, 2021 (JP) ................................ 2021-149282

(51) Int. Cl.
*B64U 10/16* (2023.01)
*B64D 27/357* (2024.01)
*B64U 50/19* (2023.01)

(52) U.S. Cl.
CPC ........... *B64U 10/16* (2023.01); *B64D 27/357* (2024.01); *B64U 50/19* (2023.01)

(58) Field of Classification Search
CPC ....... B64U 10/16; B64U 50/19; B64D 27/357
See application file for complete search history.

(56) References Cited

U.S. PATENT DOCUMENTS 8,979,023 B1 * 3/2015 Wang ..................... B64D 25/00
                                                    244/100 A
11,804,718 B2 * 10/2023 Polcuch ................... H02J 3/38
(Continued)

FOREIGN PATENT DOCUMENTS

JP    2018-122674 A    8/2018
JP    2019-59362 A     4/2019
(Continued)

OTHER PUBLICATIONS

International Search Report dated Oct. 25, 2022, issued in counterpart International Application No. PCT/JP2022/029686, with English Translation. (5 pages).
(Continued)

*Primary Examiner* — Brian M O'Hara
(74) *Attorney, Agent, or Firm* — WHDA, LLP (57) ABSTRACT

Provided is a flight device that includes multiple drive sources and that can continuously fly even when one of the drive sources stops in flight, by using the other drive source. The flight device 10 includes a first drive system 11 and a second drive system 12. The first drive system 11 includes a battery 27, rotor 151 and the like configured to be rotated by energy supplied from the battery 27, and a first control unit 20 configured to control the numbers of revolutions of the rotor 151 and the like depending on a flight condition. The second drive system includes the battery 27, rotor 181 and the like configured to be rotated by energy supplied from the battery 27, and a second control unit 21 configured to control the numbers of revolutions of the rotor 181 and the like depending on the flight condition. In the emergency flight state, when the first drive system 11 stops, the flight device 10 lands by rotating the rotor 151 and the like, and when the second drive system 12 stops, the flight device 10 lands by rotating the rotor 181 and the like.

10 Claims, 4 Drawing Sheets

(56) References Cited

U.S. PATENT DOCUMENTS

| | | | |
|---|---|---|---|
| 11,939,068 B2* | 3/2024 | Kawai | B64D 35/025 |
| 2019/0256191 A1* | 8/2019 | Suzuki | B64C 17/00 |
| 2020/0164995 A1* | 5/2020 | Lovering | B64D 31/09 |
| 2021/0016880 A1 | 1/2021 | Ishikawa et al. | |

FOREIGN PATENT DOCUMENTS

| | | |
|---|---|---|
| WO | 2018/084261 A1 | 5/2018 |
| WO | WO-2021006339 A1 * | 1/2021 |

OTHER PUBLICATIONS

Written Opinion of the International Searching Authority (Form PCT/ISA/237) dated Oct. 25, 2022, issued in counterpart International Application No. PCT/JP2022/029686. (4 pages).

Notice of Reasons for Refusal dated Oct. 5, 2021, issued in counterpart of Japanese Patent Application No. 2021-149282, with English Translation. (9 pages).

\* cited by examiner

FLIGHT DEVICE

TECHNICAL FIELD

The present invention relates to a flight device, and relates particularly to a flight device including multiple drive sources.

BACKGROUND ART

An unmanned flight device capable of flying in the air has been conventionally known. Such a flight device can fly in the air by using thrusts of rotors that are rotationally driven about vertical axes.

For example, the field of transport, the field of surveying, the field of imaging, and the like are conceivable as the fields to which such a flight device is applied. When the flight device is applied to such fields, a surveying device or an imaging device is attached to the flight device. Applying the flight device to such fields enables transport, imaging, and surveying to be performed in a region in which a person cannot enter by causing the flight device to fly in such regions. An invention relating to such a flight device is described in, for example, Patent Literature 1.

With reference to Literature 1, multiple arm portions are provided on a base body, and a motor and rotor blades are installed in an outer end portion of each arm portion. Moreover, in such a flight device, a device body base is arranged in a center portion, the arms extend from this device body base to the periphery, and the motor and the rotor are arranged in a distal end portion of each arm.

PRIOR ART LITERATURE

Patent Literature

Patent Literature 1: Japanese Patent Application Publication No. 2018-122674

SUMMARY OF THE INVENTION

Problems to be Solved by the Invention

However, in the flight device described in Patent Literature 1 described above, there is a room for improvement from a viewpoint of redundancy in flight.

Specifically, the flight device described in Patent Literature 1 includes only one drive source formed of a battery and the motors. Accordingly, when the drive source stops in flight due to a failure or the like of the motors or the battery, there is a risk that the flight device directly falls and the flight device and a payload are damaged. When the payload is an expensive high-performance camera or the like, there occurs a problem that a loss with the falling of the flight device is high.

The present invention has been made in view of such problems, and an object of the present invention is to provide a flight device that includes multiple drive sources and that can continuously fly even when one of the drive sources stops in flight, by using the other drive source.

Means for Solving the Problems

A flight device of the present invention includes: a first drive system; a second drive system being a separate system from the first drive system; and an arithmetic control unit, in which the first drive system includes a first drive source, a first rotor configured to be rotated by energy supplied from the first drive source, and a first control unit configured to control the number of revolutions of the first rotor depending on a flight condition, the second drive system includes a second drive source, a second rotor configured to be rotated by energy supplied from the second drive source, and a second control unit configured to control the number of revolutions of the second rotor depending on the flight condition, the flight device is capable of flying in a normal flight state in which the first drive system and the second drive system operate to cause the flight device to fly and in an emergency flight state in which one of the first drive system and the second drive system stops in flight, and in the emergency flight state, when the first drive system stops, the flight device lands by rotating the second rotor based on an instruction of the arithmetic control unit, and when the second drive system stops, the flight device lands by rotating the first rotor based on the instruction of the arithmetic control unit.

A flight device of the present invention includes: a first drive system; and a second drive system being a separate system from the first drive system, in which the first drive system includes a first drive source, a first rotor configured to be rotated by energy supplied from the first drive source, and a first control unit configured to control the number of revolutions of the first rotor depending on a flight condition, the second drive system includes a second drive source, a second rotor configured to be rotated by energy supplied from the second drive source, and a second control unit configured to control the number of revolutions of the second rotor depending on the flight condition, the flight device is capable of flying in a normal flight state in which the first drive system and the second drive system operate to cause the flight device to fly and in an emergency flight state in which one of the first drive system and the second drive system stops in flight, and in the emergency flight state, when the first drive system stops, the flight device lands by rotating the second rotor based on the control of the second control unit, and when the second drive system stops, the flight device lands by rotating the first rotor based on the control of the first control unit.

In the flight device of the present invention, the first rotor and the second rotor are rotated by motors, respectively.

A flight device of the present invention includes: a first drive system; a second drive system being a separate system from the first drive system; and an arithmetic control unit, in which the first drive system includes a battery, a motor configured to rotate by using electric power of the battery, and a first rotor configured to be rotationally driven by the motor, the second drive system includes an engine and a second rotor configured to be rotationally driven by the engine, the flight device is capable of flying in a normal flight state in which the first drive system and the second drive system operate to cause the flight device to fly and in an emergency flight state in which one of the first drive system and the second drive system stops in flight, and in the emergency flight state, when the first drive system stops, the flight device lands by rotating the first rotor by using electric power generated with the engine while rotating the second rotor, based on an instruction of the arithmetic control unit, and when the second drive system stops, the flight device lands by rotating the first rotor based on the instruction of the arithmetic control unit.

In the flight device of the present invention, the second drive system further includes an emergency power generator and a switching unit, in the normal flight state, the switching unit does not allow power to be transmitted from the engine to the emergency power generator, and in the emergency flight state, the switching unit transmits power from the engine to the emergency power generator to cause the emergency power generator to generate electric power.

In the flight device of the present invention, the first control unit performs the control based on information received from various types of sensors, and the second control unit is a separate body from the first control unit, and performs the control based on the information received from the various types of sensors.

Effects of the Invention

The flight device of the present invention includes the first drive system, the second drive system being the separate system from the first drive system, and the arithmetic control unit, the first drive system includes the first drive source, the first rotor configured to be rotated by the energy supplied from the first drive source, and the first control unit configured to control the number of revolutions of the first rotor depending on the flight condition, the second drive system includes the second drive source, the second rotor configured to be rotated by the energy supplied from the second drive source, and the second control unit configured to control the number of revolutions of the second rotor depending on the flight condition, the flight device is capable of flying in the normal flight state in which the first drive system and the second drive system operate to cause the flight device to fly and in the emergency flight state in which one of the first drive system and the second drive system stops in flight, and in the emergency flight state, when the first drive system stops, the flight device lands by rotating the second rotor based on the instruction of the arithmetic control unit, and when the second drive system stops, the flight device lands by rotating the first rotor based on the instruction of the arithmetic control unit. Accordingly, in the flight device of the present invention, even in the emergency flight state in which one of the first drive system and the second drive system stops in flight, the other one of the first drive system and the second drive system that has not stopped rotates the rotor, and this allows the flight device to safely land. Thus, crashing, breaking, and the like of the flight device can be prevented.

Moreover, the flight device of the present invention includes the first drive system and the second drive system being the separate system from the first drive system, the first drive system includes the first drive source, the first rotor configured to be rotated by the energy supplied from the first drive source, and the first control unit configured to control the number of revolutions of the first rotor depending on the flight condition, the second drive system includes the second drive source, the second rotor configured to be rotated by the energy supplied from the second drive source, and the second control unit configured to control the number of revolutions of the second rotor depending on the flight condition, the flight device is capable of flying in the normal flight state in which first drive system and the second drive system operate to cause the flight device to fly and in the emergency flight state in which one of the first drive system and the second drive system stops in flight, and in the emergency flight state, when the first drive system stops, the flight device lands by rotating the second rotor based on the control of the second control unit, and when the second drive system stops, the flight device lands by rotating the first rotor based on the control of the first control unit. Accordingly, in the flight device of the present invention, since each of the first drive system and the second drive system includes the control unit, even if one of the control systems stops in flight, the flight device can safely land by rotating the rotor based on the instruction from the control unit of the other control system that is operating.

Furthermore, in the flight device of the present invention, the first rotor and the second rotor are rotated by the motors, respectively. Accordingly, in the flight device of the present invention, in an electric drone using only the motors as the drive sources, the flight device can be prevented from falling in the case where a failure occurs in the drive system in flight.

Moreover, the flight device of the present invention includes the first drive system, the second drive system being the separate system from the first drive system, and the arithmetic control unit, the first drive system includes the battery, the motor configured to rotate by using the electric power of the battery, and the first rotor configured to be rotationally driven by the motor, the second drive system includes the engine and the second rotor configured to be rotationally driven by the engine, the flight device is capable of flying in the normal flight state in which the first drive system and the second drive system operate to cause the flight device to fly and in the emergency flight state in which one of the first drive system and the second drive system stops in flight, and in the emergency flight state, when the first drive system stops, the flight device lands by rotating the first rotor by using the electric power generated with the engine while rotating the second rotor, based on the instruction of the arithmetic control unit, and when the second drive system stops, the flight device lands by rotating the first rotor based on the instruction of the arithmetic control unit. Accordingly, in the flight device of the present invention, in a so-called parallel hybrid drone that includes a motor and an engine as the power sources, even if one of the control systems stops in flight, the flight device can safely land by rotating the rotor based on the instruction from the control unit of the other control system that is operating.

Furthermore, in the flight device of the present invention, the second drive system further includes the emergency power generator and the switching unit, in the normal flight state, the switching unit does not allow power to be transmitted from the engine to the emergency power generator, and in the emergency flight state, the switching unit transmits power from the engine to the emergency power generator to cause the emergency power generator to generate electric power. Accordingly, in the flight device of the present invention, since the flight device includes the emergency power generator, in the emergency flight state, the flight device can land while generating electric power with the emergency power generator and executing the attitude control of a base body with the rotors that are rotated by the generated electric power.

Moreover, in the flight device of the present invention, the first control unit performs the control based on the information received from the various types of sensors, and the second control unit is a separate body from the first control unit, and performs the control based on the information received from the various types of sensors. Accordingly, in the flight device of the present invention, even if one of the first drive system and the second drive system fails in flight, the flight device can continue to stably fly by using the control unit in the other one of the first drive system and the second drive system.

MODE FOR CARRYING OUT THE INVENTION

A flight device 10 according to the present embodiment is described below with reference to the drawings. In the following description, the same parts are denoted by the same reference numerals in principle, and repeated description is omitted. Moreover, although directions of up, down, front, rear, left, and right are used in the following description, the left and the right are left and right in the case where the flight device 10 is viewed from the rear side in FIG. 1.

Figure 1:
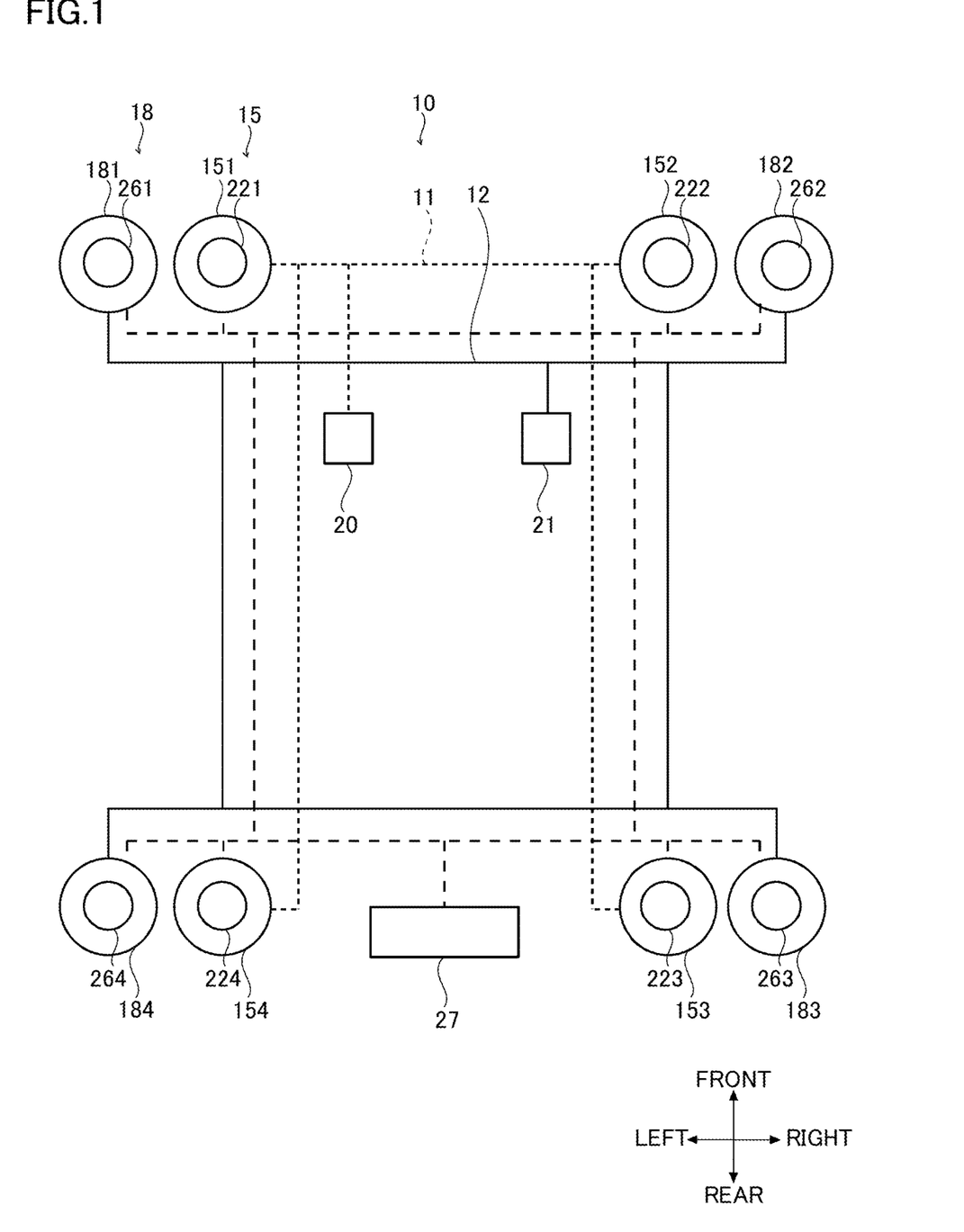
FIG. 1 is a diagram illustrating a configuration of a flight device according to an embodiment of the present invention.

FIG. 1 is a diagram illustrating a configuration of the flight device 10.

The flight device 10 includes a first drive system 11 and a second drive system 12 being a separate system from the first drive system 11. In FIG. 1, various component devices forming the first drive system 11 are connected to one another by connection lines illustrated by dense dotted lines. Moreover, various component devices forming the second drive system 12 are connected to one another by connection lines illustrated by solid lines. Furthermore, paths through which electric power is supplied from a battery 27 to a motor 221 and the like are illustrated by coarse dotted lines.

The flight device 10 is wirelessly connected to an operation device that is operated by an operator not illustrated herein, and ascending, descending, moving, hovering, and the like of the flight device 10 are performed based on operation signals received from the operation device.

The first drive system 11 includes the battery 27 that is a first drive source, a rotor 151 and the like as rotors 15 (first rotors) configured to be rotated by energy supplied from the battery 27, the motor 221 and the like configured to rotate the rotor 151 and the like, and a first control unit 20 configured to control the numbers of revolutions of the motor 221 and the like depending on a flight condition.

Specifically, the first drive system 11 includes the rotor 151, a rotor 152, a rotor 153, and a rotor 154 as the rotors 15. The rotor 151 is arranged in a front left portion, the rotor 152 is arranged in a front right portion, the rotor 153 is arranged in a rear right portion, and the rotor 154 is arranged in a rear left portion. Moreover, the rotor 151 is rotationally driven by the motor 221, the rotor 152 is rotationally driven by a motor 222, the rotor 153 is rotationally driven by a motor 223, and the rotor 154 is rotationally driven by a motor 224. The motor 221 to the motor 224 are rotationally driven by the electric power supplied from the battery 27, and the first control unit 20 controls the rotation speeds of these motors.

The first control unit 20 is a flight controller, and controls the numbers of revolutions of the motor 221 to the motor 224 to control the position and the attitude of the flight device 10, based on various physical quantities relating to the flight device 10. The first control unit 20 receives various types of physical quantities from various types of sensors not illustrated herein, specifically, for example, an acceleration sensor, an angular velocity sensor, a geomagnetic sensor, an air pressure sensor, a GNSS antenna, and the like.

The second drive system 12 includes the battery 27 as a second drive source, a rotor 181 and the like as rotors 18 (second rotors) configured to be rotated by energy supplied from the second drive source 17, a motor 261 and the like configured to rotate the rotor 181 and the like, and a second control unit 21 configured to control the numbers of revolutions of the motor 261 and the like depending on the flight condition.

Specifically, the second drive system 12 includes the rotor 181, a rotor 182, a rotor 183, and a rotor 184 as the rotors 18. The rotor 181 is arranged in the front left portion, the rotor 182 is arranged in the front right portion, the rotor 183 is arranged in the rear right portion, and the rotor 184 is arranged in the rear left portion. Moreover, the rotor 181 is rotationally driven by the motor 261, the rotor 182 is rotationally driven by a motor 262, the rotor 183 is rotationally driven by a motor 263, and the rotor 184 is rotationally driven by a motor 264. The motor 262 to the motor 264 are driven by the electric power supplied from the battery 27, and the second control unit 21 controls the rotation speeds of these motors.

The second control unit 21 is a flight controller provided as a separate body from the first control unit 20, and controls the numbers of revolutions of the motor 261 to the motor 264 to control the position and the attitude of the flight device 10, based on the various physical quantities relating to the flight device 10.

The flight device 10 can fly in a normal flight state in which the first drive system 11 and the second drive system 12 operate to cause the flight device 10 to fly and in an emergency flight state in which one of the first drive system 11 and the second drive system 12 stops in flight.

In the emergency flight state, when the first drive system 11 stops, the flight device 10 lands by rotating the rotor 181 and the like based on control of the second control unit 21. Meanwhile, when the second drive system 12 stops, the flight device 10 lands by rotating the rotor 151 and the like based on control of the first control unit 20. Specific operations of the flight device 10 are described later with reference to FIG. 2.

In this case, the rotor 181 and the rotor 151 may be arranged to overlap each other in the up-down direction in the front left portion of the flight device 10 or arranged not to overlap each other. Such matters apply also to the other rotor 152 and rotor 182.

Figure 2:
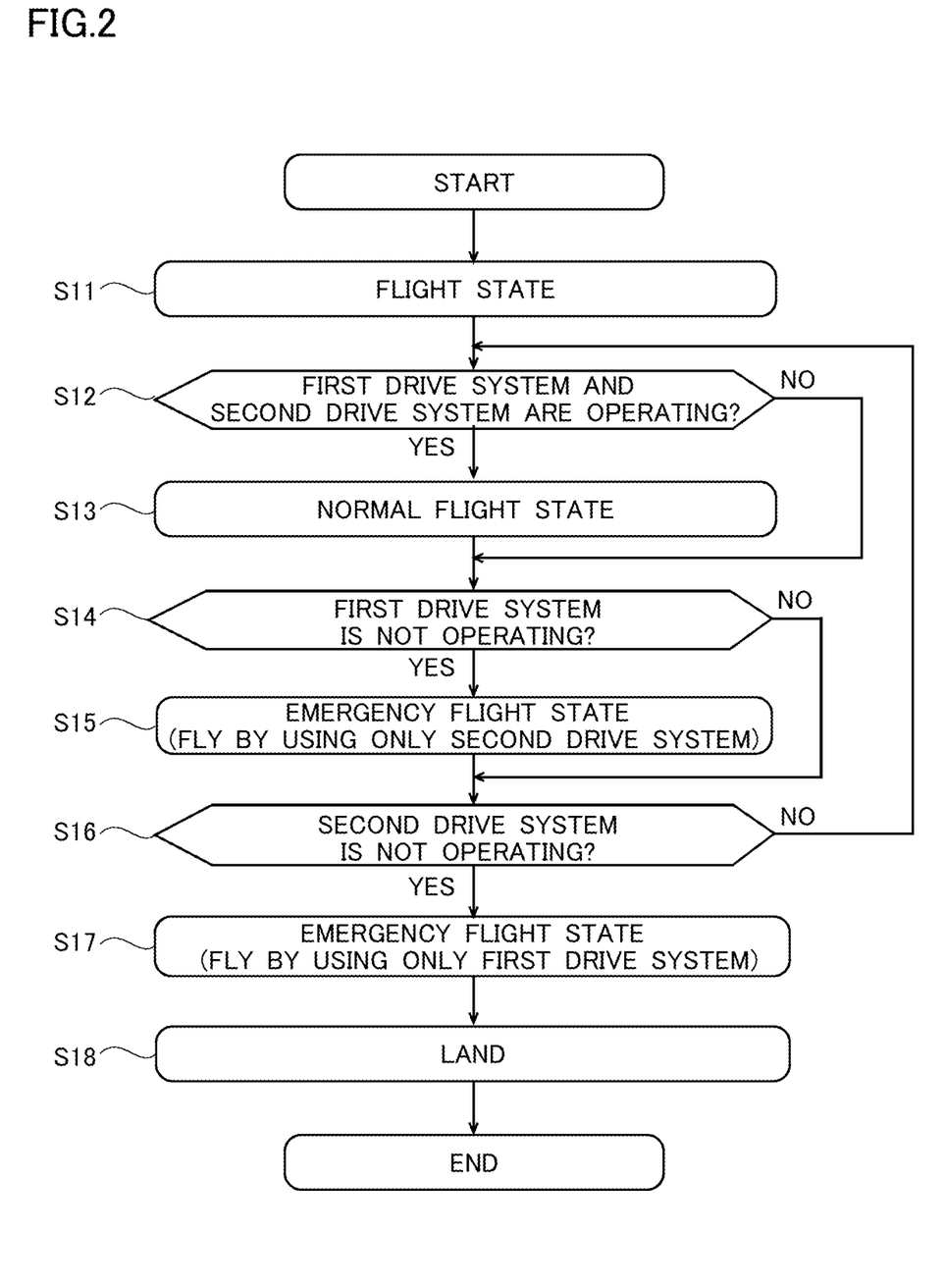
FIG. 2 is a flowchart illustrating operations of the flight device according to the embodiment of the present invention.

FIG. 2 is a flowchart illustrating operations of the flight device 10 illustrated in FIG. 1.

In step S11, the flight device 10 rotates the rotors 15 and the rotors 18 to take off from the ground, and then flies in the air. In this case, the flight device 10 executes ascending, hovering, moving, descending, spraying of agricultural chemicals and the like, picture imaging, and the like based on instructions from the operator located on the ground.

In step S12, whether the first drive system 11 and the second drive system 12 are operating is determined. This determination may be performed by the first control unit 20 or the second control unit 21, or may be performed by a companion controller provided separately from the control units. Such matters also apply to the following description.

In the case of YES in step S12, since both of the first drive system 11 and the second drive system 12 are operating, that is since both of the set of rotors 15 and the set of rotors 18 are rotating, an arithmetic control unit 13 transitions to step S13.

In the case of NO in step S12, since one of the first drive system 11 and the second drive system 12 is not operating, that is since one of the set of rotors 15 and the set of rotors 18 is not rotating, the arithmetic control unit 13 transitions to step S14.

In step S13, the first control unit 20 and the second control unit 21 executes the normal flight state. Specifically, the first control unit 20 rotates the rotor 151 to the rotor 154 at predetermined rotation speeds by driving the motor 221 to the motor 224 and causing the motor 221 to the motor 224 to rotate based on the information received from the various types of sensors. Similarly, the second control unit 21 also rotate the rotor 181 to the rotor 184 at predetermined rotation speeds by driving the motor 261 to the motor 264 and causing the motor 261 to the motor 264 to rotate based on the information received from the various types of sensors.

In step S14, whether the first drive system 11 is not operating is checked. The case where the first drive system 11 is not operating is specifically the case where power supply from the battery 27 to the first drive system 11 stops, the case where the first control unit 20 fails, the case where a conductive wire connecting the first drive system 11 and the motor 221 and the like breaks, the case where any of the motor 221 to the motor 224 fails, the case where any of the rotor 151 to the rotor 154 is damaged, and the like. In the case where the first drive system 11 is not operating, the rotor 151 to the rotor 154 cannot be rotated at predetermined speeds.

In the case of YES in step S14, that is when the first drive system 11 is not operating, the processing transitions to step S15.

In the case of NO in step S14, that is when the first drive system 11 is operating, the processing transitions to step S16.

In step S15, the flight device 10 goes into the emergency flight state. Specifically, the rotor 151 to the rotor 154 are not rotated due to the stop of the first drive system 11, and the flying state of the flight device 10 is maintained by the rotation of the rotor 181 to the rotor 184 of the second drive system 12. The second control unit 21 executes a landing operation by rotating the rotor 181 to the rotor 184 of the second control unit 21. This allows the flight device 10 to land safely by using the second drive system 12 even if the first drive system 11 stops in flight, and it is possible to prevent breaking of the flight device 10 itself and an expensive camera or the like provided in the flight device 10.

In step S16, whether the second drive system 12 is not operating is checked. The case where the second drive system 12 is not operating is specifically the case where power supply from the battery 27 to the second drive system 12 stops, the case where the second control unit 21 fails, the case where a conductive wire connecting the second drive system 12 and the motor 221 and the like breaks, the case where any of the motor 261 to the motor 264 fails, the case where any of the rotor 181 to the rotor 184 is damaged, and the like. In the case where the second drive system 12 is not operating, the rotor 181 to the rotor 184 cannot be rotated at predetermined speeds.

In the case of YES in step S16, that is when the second drive system 12 is not operating, the processing transitions to step S17.

In the case of NO in step S16, that is when the second drive system 12 is operating, the processing transitions to step S12, and the normal flight state in which the flight device 10 flies by using the first control unit 20 and the second control unit 21 is executed.

In step S17, the flight device 10 goes into the emergency flight state. Specifically, the rotor 183 to the rotor 184 are not rotated due to the stop of the second drive system 12, and the flying state of the flight device 10 is maintained by the rotation of the rotor 151 to the rotor 154 of the first drive system 11. The first control unit 20 executes the landing operation by rotating the rotor 151 to the rotor 154 of the first drive system 11. This allows the flight device 10 to land safely by using the first drive system 11 even if the second drive system 12 stops in flight, and it is possible to prevent breaking of the flight device 10 itself and the expensive camera or the like provided in the flight device 10.

In step S18, the flight device 10 is made to land on the ground. In this case, in the emergency flight state, the flight device 10 may be made to land vertically or to land near an area where the operator operating the flight device 10 on the ground is present.

Figure 3:
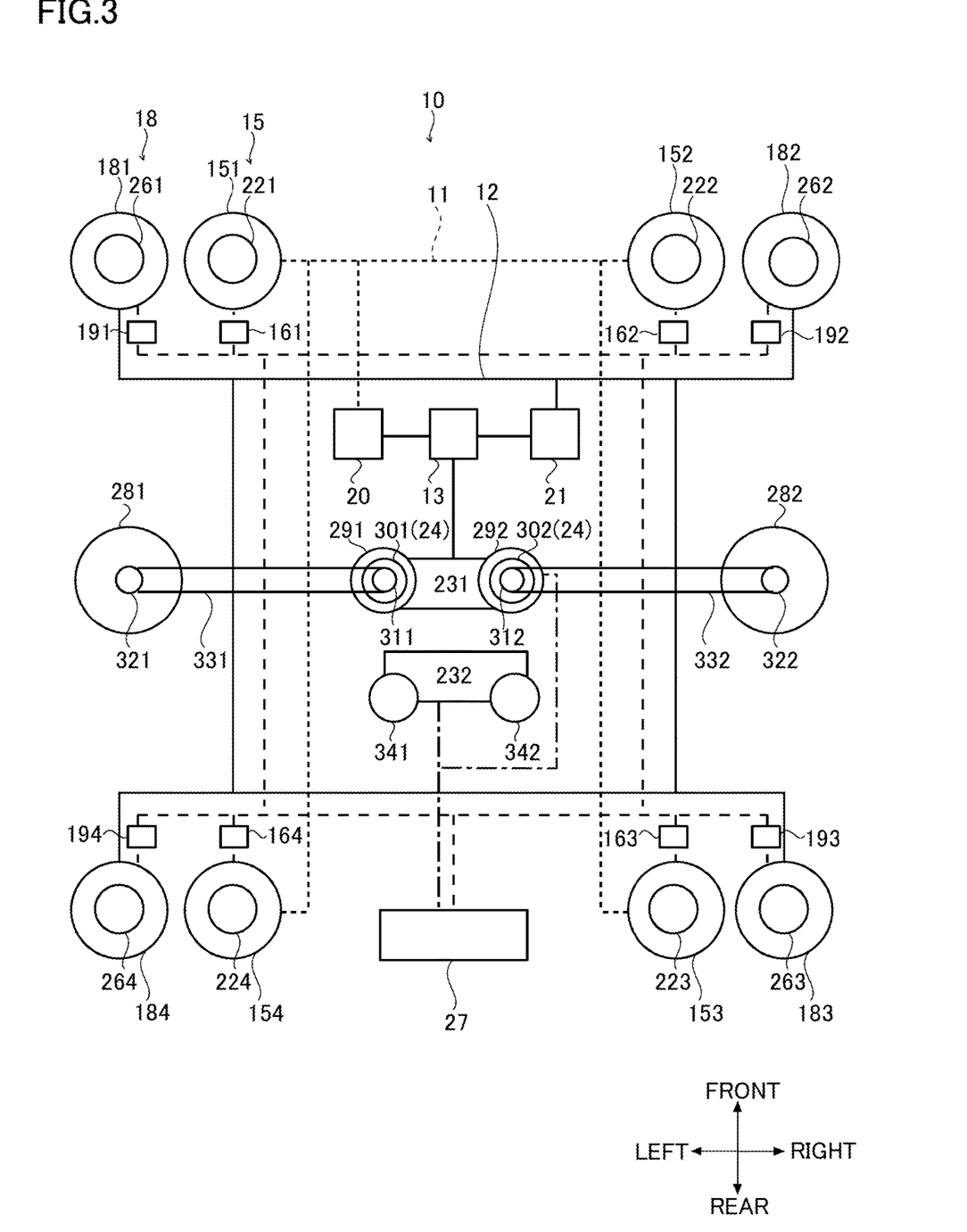
FIG. 3 is a diagram illustrating a configuration of the flight device according to another mode of the present invention.

FIG. 3 is a diagram illustrating a configuration of the flight device 10 according to another mode of the present invention. The flight device 10 illustrated in FIG. 3 is similar to the flight device illustrated in FIG. 1, and is a parallel hybrid drone including a first engine 231 and the like.

The flight device 10 includes the first engine 231 and a second engine 232 as power sources in addition to the battery 27.

The first engine 231 mechanically rotates a rotor 281 and the like to be described later, and also functions as a power generator in the emergency flight state.

A clutch 291 as a switching unit, a power generator 301, and a pulley 311 are connected to a rotating shaft of the first engine 231.

The clutch 291 is, for example, an electromagnetic clutch or a centrifugal clutch, and is arranged between an output shaft of the first engine 231 and the pulley 311. The clutch 291 drivingly connects the output shaft and the pulley 311 to each other when output power of the first engine 231 is within a certain range. Meanwhile, the clutch 291 does not drivingly connect the output shaft and the pulley 311 to each other at start and stop of the first engine 231.

A clutch 292 is, for example, an electromagnetic clutch or a centrifugal clutch, and is arranged between another output shaft of the first engine 231 and a pulley 312. The clutch 292 drivingly connects the output shaft and the pulley 312 to each other when another output power of the first engine 231 is within a certain range. Meanwhile, the clutch 292 does not drivingly connect the output shaft and the pulley 312 to each other at start and stop of the first engine 231.

The power generator 301 does not operate in the normal flight state, and functions as an emergency power generator 24 in the emergency flight state by being drivingly connected to the output shaft of the first engine 231 by a clutch not illustrated herein. Moreover, the power generator 301 also function as a starter in start-up of the first engine 231.

The clutch 292, a power generator 302, and the pulley 312 are connected to the other rotating shaft of the first engine 231.

The power generator 302 does not operate in the normal flight state, and functions as the emergency power generator 24 in the emergency flight state by being drivingly connected to the output shaft of the first engine 231 by a clutch not illustrated herein. Moreover, the power generator 302 also function as a starter in start-up of the first engine 231.

The rotor 281 is a rotor with a larger diameter than the rotor 181 and the like that are sub-rotors, and is also referred to as main rotor. A pulley 321 is attached at the center of the rotor 281, and a belt 331 runs between the pulley 321 and the pulley 311.

Similarly, a pulley 322 is attached at a center of a rotor 282, and a belt 332 runs between a pulley 322 and the pulley 312.

When the first engine 231 operates in the above-mentioned configuration, the rotor 281 is rotated at a predetermined speed by power transmitted via the pulley 311, the belt 331, and the pulley 321. Similarly, the rotor 282 is rotated at a predetermined speed by power transmitted via the pulley 312, the belt 332, and the pulley 322.

The second engine 232 is an engine for generating power for driving a power generator 341 and a power generator 342. Output power of the second engine 232 is set such that power generation amounts obtained from the power generator 341 and the power generator 342 are certain amounts.

Moreover, the flight device 10 includes a power conditioner 161 to a power conditioner 164 and a power conditioner 191 to a power conditioner 194 as power converters. Specifically, the power conditioner 161 is arranged between the battery 27 and the motor 221, the power conditioner 162 is arranged between the battery 27 and the motor 222, the power conditioner 163 is arranged between the battery 27 and the motor 223, and the power conditioner 164 is arranged between the battery 27 and the motor 224. Furthermore, the power conditioner 191 is arranged between the battery 27 and the motor 261, the power conditioner 192 is arranged between the battery 27 and the motor 262, the power conditioner 193 is arranged between the battery 27 and the motor 263, and the power conditioner 194 is arranged between the battery 27 and the motor 264. In this case, the power conditioner 161 to the power conditioner 194 can be each directly connected to the power generator 341 or the power generator 342 without being connected via the battery 27.

A converter is built in each of the power conditioner 161 to the power conditioner 194 to convert AC electric power generated by the power generator 341 or the power generator 342 to DC electric power. The converted electric power is converted to AC electric power of a predetermined frequency by an inverter included in a driver provided in each motor. Each motor rotates by using such AC power, and each rotor is thereby rotated at a predetermined speed.

In this case, the power conditioner 161 to the power conditioner 164 are controlled by the first control unit 20, and the rotation speeds of the motor 221 to the motor 224 can be thereby controlled. Moreover, the power conditioner 191 to the power conditioner 194 are controlled by the second control unit 21, and the rotation speeds of the motor 261 to the motor 264 can be thereby controlled.

Figure 4:
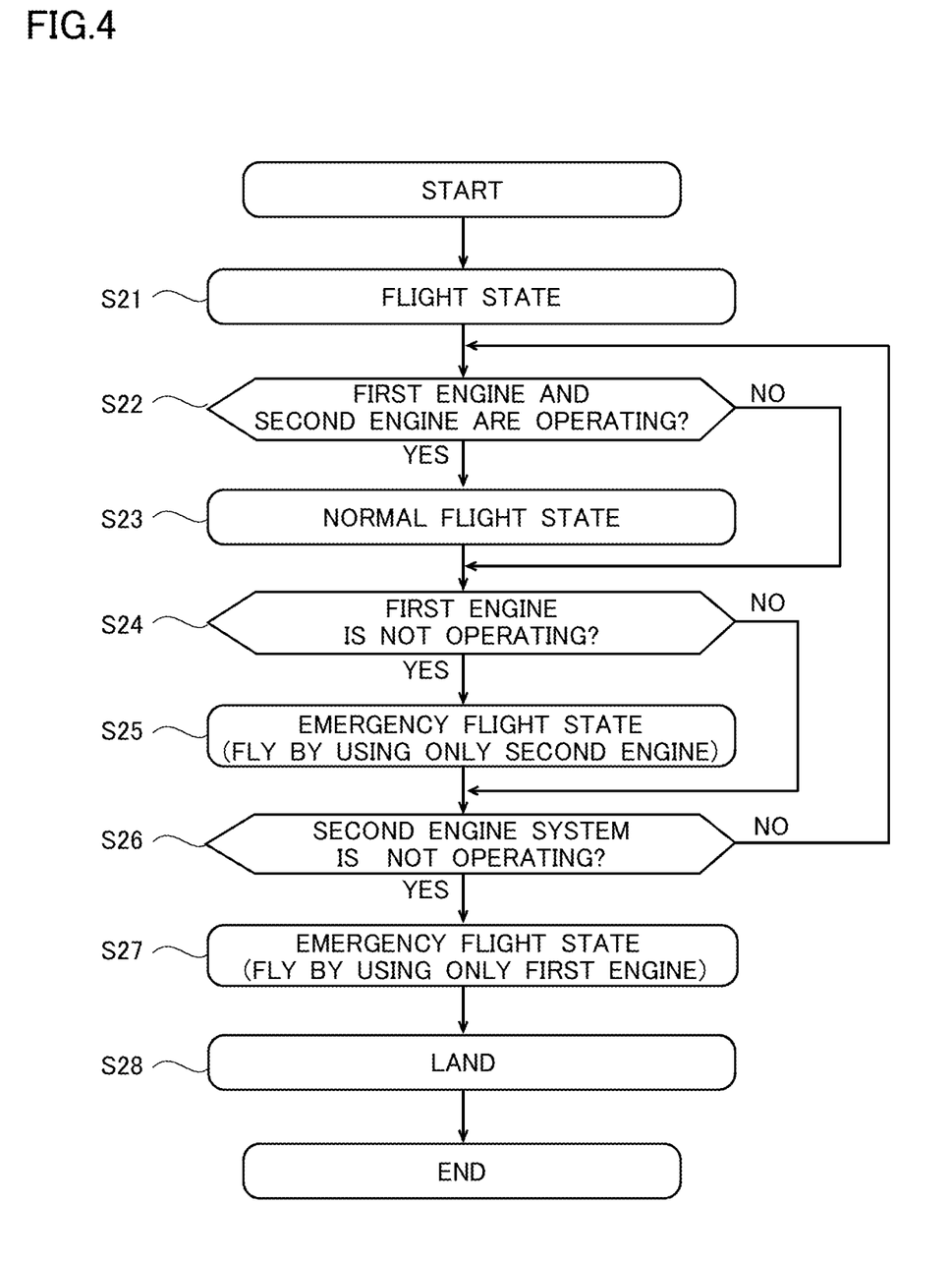
FIG. 4 is a flowchart illustrating operations of the flight device according to the other mode of the present invention.

FIG. 4 is a flowchart illustrating operations of the flight device 10 according to the other mode of the present invention. In the flight device 10, the rotor 281 and the rotor 282 that are mechanically driven by the first engine 231 generate a thrust for mainly lifting the flight device 10, and the rotors 15 and the rotors 18 generate a thrust for controlling the attitude of the flight device 10.

In step S21, when the first engine 231 and the second engine 232 are started and the numbers of revolutions of both engines reach a certain level, the arithmetic control unit 13 connects the clutch 291 and the clutch 292 to transmit drive force to the pulley 311 and the pulley 312. As a result, such transmitted force is transmitted to the pulley 321 and the pulley 322 via the belt 331 and the belt 332, and the rotor 281 and the rotor 282 are rotated at predetermined speeds. Moreover, the rotors 15 and the rotors 18 are also rotated at predetermined speeds for attitude control or the like by using the electric power generated by the power generator 341 and the power generator 342 driven by the second engine 232.

In step S22, the arithmetic control unit 13 checks whether the first engine 231 and the second engine 232 are normally operating.

In the case of YES in step S22, energy necessary for the flight of the flight device 10 is generated by the first engine 231 and the second engine 232 that are the power sources, and the arithmetic control unit 13 transitions to step S23.

In the case of NO in step S22, one of the first engine 231 and the second engine 232 that are the power sources has stopped. In this case, since it is difficult to maintain the normal flight state and the flight device 10 is in the emergency flight state, the arithmetic control unit 13 transitions to step S24.

In step S23, since the first engine 231 and the second engine 232 are operating without trouble, the arithmetic control unit 13 maintains the normal flight state without change.

In step S24, the arithmetic control unit 13 checks whether the first engine 231 is not operating.

In the case of YES in step S24, the arithmetic control unit 13 transitions to step S25.

In the case of NO in step S24, the arithmetic control unit 13 transitions to step S26.

In step S25, the arithmetic control unit 13 continues the flight of the flight device 10 by using only the energy obtained from the second engine 232 in the emergency flight state. Specifically, the power generator 341 and the power generator 342 drivingly connected to the second engine 232 are driven. For example, in step S25, the output power of the power generator 341 and the power generator 342 is increased from that in step S23 in which the normal flight state is performed. This can cause the thrust of the rotors 15 and the rotors 18 in step S25 to be larger than the thrust of the rotors 15 and the rotors 18 in step S23, and suppress sudden dive of the flight device 10.

In this case, in step S25, it is possible to stop the power transmission by the clutch 291 and the clutch 292, rotate the pulley 311 and the pulley 312 with motors not illustrated herein, and rotate the rotor 281 and the rotor 282. In this case, the emergency power generator 24 may be operated or may not be operated.

The control in step S25 may be performed by the arithmetic control unit 13 or by any of the arithmetic control unit 13, the first control unit 20, and the second control unit 21.

In step S26, the arithmetic control unit 13 checks whether the second engine 232 is operating or not.

In the case of YES in step S26, the arithmetic control unit 13 transitions to step S27.

In the case of NO in step S26, the arithmetic control unit 13 transitions to step S22.

In step S27, the arithmetic control unit 13 continues the flight of the flight device 10 by using only the energy obtained from the first engine 231. Specifically, the first engine 231 operates to rotate the rotor 281 and the rotor 282, and the thrust for lifting the flight device 10 is obtained by this rotation. In this case, the thrust generated by the rotor 281 and the rotor 282 can be made larger than that in the normal flight state.

Moreover, a clutch not illustrated herein is set to a connected state based on an instruction of the arithmetic control unit 13 to cause the power generator 301 and the power generator 302 that are the emergency power generator 24 to generate electric power by using the drive force of the first engine 231. The electric power generated by the power generator 301 and the power generator 302 is supplied to the motors that rotate the rotors 15 and the rotors 18, respectively. Employing such a configuration allows the thrust to be secured by rotating the rotor 281 and the rotor 282 by the power generated by the first engine 231. Moreover, the attitude control of the flight device 10 is performed by rotating the rotors 15 and the rotors 18 by using the electric power generated by the power generator 301 and the power generator 302 that are the emergency power generator 24.

In step S28, the arithmetic control unit 13 lands the flight device 10. Specifically, the rotor 281 and the rotor 282 are rotated by the drive force generated by the first engine 231, and the flight device 10 is made to gradually descend. Moreover, the rotors 15 and the rotors 18 can be rotated by the electric power generated by the power generator 301 and the power generator 302 to perform the attitude control of the flight device 10 in the landing.

That is the description relating to the operations of the flight device 10, whose configuration is illustrated in FIG. 3, in the normal flight state and the emergency flight state.

The present embodiment described above can have the following main effects.

In the flight device 10 of the present invention, even in the emergency flight state in which one of the first drive system 11 and the second drive system 12 stops in flight, the other one of the first drive system 11 and the second drive system 12 that has not stopped rotates the rotors, and this allows the flight device 10 to safely land. Thus, crashing, breaking, and the like of the flight device can be prevented.

Moreover, since each of the first drive system 11 and the second drive system 12 includes the control unit, even if one of the control systems stops in flight, the flight device 10 can safely land by rotating the rotors 18 and the like based on instructions from the control unit of the other control system that is operating.

Moreover, in an electric drone that uses only the electric motors as the drive source, the flight device 10 can be prevented from falling when a failure occurs in a drive system in flight.

Moreover, in a so-called parallel hybrid drone that includes a motor and an engine as the power sources, even if one of the control systems stops in flight, the flight device can safely land by rotating the rotors based on the instruction from the control unit of the other control system that is operating.

Furthermore, since the flight device 10 includes the emergency power generator 24, the flight device 10 can land by generating electric power with the emergency power generator 24 and executing the attitude control of the base body with the rotors 15 and the like that are rotated by the generated electric power.

Although the embodiment of the present invention has been described above, the present invention is not limited to this embodiment, and changes can be made within a scope not departing from the gist of the present invention. Moreover, the modes described above can be combined with one another.

In the flight device 10 illustrated in FIG. 1, the first drive system 11 and the second drive system 12 include the individual first control unit 20 and second control unit 21. However, the first drive system 11 and the second drive system 12 can be controlled by one first control unit 20.

With reference to FIG. 3, although the flight device 10 includes the rotors 15 and the rotors 18, the flight device 10 may include only one of the set of rotors 15 and the set of rotors 18.

Moreover, with reference to FIG. 1, the first control unit 20 and the second control unit 21 can be integrated into one control unit. In this case, with reference to FIG. 2, in step S15 and step S17, the integrated control unit controls the first drive system 11 or the second drive system 12. Such matters apply also to the flight device 10 illustrated in FIG. 3. Specifically, with reference to FIG. 4, in step S25 or step S27, the integrated control unit controls the first drive system 11 or the second drive system 12.

EXPLANATION OF THE REFERENCE NUMERALS 10 flight device
11 first drive system
12 second drive system
13 arithmetic control unit
14 first drive source
151 rotor
152 rotor
153 rotor
154 rotor
161 power conditioner
162 power conditioner
163 power conditioner
164 power conditioner
17 second drive source
18 rotor
181 rotor
182 rotor
183 rotor
184 rotor
191 power conditioner
192 power conditioner
193 power conditioner
194 power conditioner
20 first control unit
21 second control unit
22 motor
221 motor
222 motor
223 motor
224 motor
231 first engine
232 second engine
24 emergency power generator
25 switching unit
26 motor
261 motor
262 motor
263 motor
264 motor
27 battery
281 rotor
282 rotor
291 clutch
292 clutch
301 power generator
302 power generator
311 pulley
312 pulley
321 pulley
322 pulley
331 belt
332 belt
341 power generator
342 power generator

The invention claimed is:

1. A flight device comprising:
a first drive system;
a second drive system being a separate system from the first drive system; and
an arithmetic control unit, wherein the first drive system includes a first drive source, a first rotor configured to be rotated by energy supplied from the first drive source, and a first control unit configured to control the number of revolutions of the first rotor depending on a flight condition, the second drive system includes a second drive source, a second rotor configured to be rotated by energy supplied from the second drive source, and a second control unit configured to control the number of revolutions of the second rotor depending on the flight condition, the flight device is capable of flying in a normal flight state in which the first drive system and the second drive system operate to cause the flight device to fly and in an emergency flight state in which one of the first drive system and the second drive system stops in flight, and in the emergency flight state,
 when the first drive system stops, the flight device lands by rotating the second rotor based on an instruction of the arithmetic control unit, and
 when the second drive system stops, the flight device lands by rotating the first rotor based on the instruction of the arithmetic control unit, wherein the first control unit is a flight controller which receives physical quantity relating to the flight device from various types of sensors and performs the control based on the received physical quantity, the second control unit is a flight controller which receives physical quantity relating to the flight device from the various types of sensors and performs the control based on the received physical quantity, and the second control unit is a separate body from the first control unit.

2. A flight device comprising:
a first drive system; and
a second drive system being a separate system from the first drive system, wherein
the first drive system includes a first drive source, a first rotor configured to be rotated by energy supplied from the first drive source, and a first control unit configured to control the number of revolutions of the first rotor depending on a flight condition,
the second drive system includes a second drive source, a second rotor configured to be rotated by energy supplied from the second drive source, and a second control unit configured to control the number of revolutions of the second rotor depending on the flight condition,
the flight device is capable of flying in a normal flight state in which the first drive system and the second drive system operate to cause the flight device to fly and in an emergency flight state in which one of the first drive system and the second drive system stops in flight, and
in the emergency flight state,
 when the first drive system stops, the flight device lands by rotating the second rotor based on the control of the second control unit, and
 when the second drive system stops, the flight device lands by rotating the first rotor based on the control of the first control unit,
wherein the first control unit is a flight controller which receives physical quantity relating to the flight device from various types of sensors and performs the control based on the received physical quantity, the second control unit is a flight controller which receives physical quantity relating to the flight device from the various types of sensors and performs the control based on the received physical quantity, and the second control unit is a separate body from the first control unit.

3. The flight device according to claim 1, wherein the first rotor and the second rotor are rotated by motors, respectively.

4. The flight device according to claim 2, wherein the first rotor and the second rotor are rotated by motors, respectively.

5. A flight device comprising:
a first drive system;
a second drive system being a separate system from the first drive system; and
an arithmetic control unit, wherein
the first drive system includes a battery, a motor configured to rotate by using electric power of the battery, a first rotor configured to be rotationally driven by the motor, and a first control unit configured to control the number of revolutions of the first rotor depending on a flight condition,
the second drive system includes an engine, a second rotor configured to be rotationally driven by the engine, and a second control unit configured to control the number of revolutions of the second rotor depending on the flight condition,
the flight device is capable of flying in a normal flight state in which the first drive system and the second drive system operate to cause the flight device to fly and in an emergency flight state in which one of the first drive system and the second drive system stops in flight, and
in the emergency flight state,
 when the first drive system stops, the flight device lands by rotating the first rotor by using electric power generated with the engine while rotating the second rotor, based on an instruction of the arithmetic control unit, and
 when the second drive system stops, the flight device lands by rotating the first rotor based on the instruction of the arithmetic control unit,
wherein the first control unit is a flight controller which receives physical quantity relating to the flight device from various types of sensors and performs the control based on the received physical quantity, the second control unit is a flight controller which receives physical quantity relating to the flight device from the various types of sensors and performs the control based on the received physical quantity, and the second control unit is a separate body from the first control unit.

6. The flight device according to claim 5, wherein
the second drive system further includes an emergency power generator and a switching unit,
in the normal flight state, the switching unit does not allow power to be transmitted from the engine to the emergency power generator, and
in the emergency flight state, the switching unit transmits power from the engine to the emergency power generator to cause the emergency power generator to generate electric power.

7. A method of operating a flight device, the flight device comprising:
a first drive system; and a second drive system being a separate system from the first drive system, wherein the first drive system includes a first drive source, a first rotor configured to be rotated by energy supplied from the first drive source, and a first control unit configured to control the number of revolutions of the first rotor depending on a flight condition, the second drive system includes a second drive source, a second rotor configured to be rotated by energy supplied from the second drive source, and a second control unit configured to control the number of revolutions of the second rotor depending on the flight condition, the flight device is capable of flying in a normal flight state in which the first drive system and the second drive system operate to cause the flight device to fly and in an emergency flight state in which one of the first drive system and the second drive system stops in flight, and the method comprises:

in the emergency flight state, when the first drive system stops, landing the flight device by rotating the second rotor, and when the second drive system stops, landing the flight device by rotating the first rotor, wherein the first control unit is a flight controller which receives physical quantity relating to the flight device from various types of sensors and performs the control based on the received physical quantity, the second control unit is a flight controller which receives physical quantity relating to the flight device from the various types of sensors and performs the control based on the received physical quantity, and the second control unit is a separate body from the first control unit.

8. The method according to claim 7, wherein the first rotor and the second rotor are rotated by motors, respectively.

9. A method of operating a flight device, the flight device comprising:

a first drive system; and a second drive system being a separate system from the first drive system, wherein the first drive system includes a battery, a motor configured to rotate by using electric power of the battery, a first rotor configured to be rotationally driven by the motor, and a first control unit configured to control the number of revolutions of the first rotor depending on a flight condition, the second drive system includes an engine, a second rotor configured to be rotationally driven by the engine, and a second control unit configured to control the number of revolutions of the second rotor depending on the flight condition, the flight device is capable of flying in a normal flight state in which the first drive system and the second drive system operate to cause the flight device to fly and in an emergency flight state in which one of the first drive system and the second drive system stops in flight, and the method comprises:

in the emergency flight state, when the first drive system stops, landing the flight device by rotating the first rotor by using electric power generated with the engine while rotating the second rotor, and when the second drive system stops, landing the flight device by rotating the first rotor, wherein the first control unit is a flight controller which receives physical quantity relating to the flight device from various types of sensors and performs the control based on the received physical quantity, the second control unit is a flight controller which receives physical quantity relating to the flight device from the various types of sensors and performs the control based on the received physical quantity, and the second control unit is a separate body from the first control unit.

10. The method according to claim 9, wherein the second drive system further includes an emergency power generator and a switching unit, in the normal flight state, the switching unit does not allow power to be transmitted from the engine to the emergency power generator, and in the emergency flight state, the switching unit transmits power from the engine to the emergency power generator to cause the emergency power generator to generate electric power.

* * * * *